(12) United States Patent
Rajsic et al.

(10) Patent No.: US 7,729,261 B2
(45) Date of Patent: Jun. 1, 2010

(54) FORWARDING OF NETWORK TRAFFIC IN RESPECT OF DIFFERENTIATED RESTRICTED TRANSIT NETWORK NODES

(75) Inventors: Carl Rajsic, Nepean (CA); Maged Edward Shaker, Ottawa (CA)

(73) Assignee: Alcatel Lucent, Paris (FR)

( * ) Notice: Subject to any disclaimer, the term of this patent is extended or adjusted under 35 U.S.C. 154(b) by 1042 days.

(21) Appl. No.: 10/914,170

(22) Filed: Aug. 10, 2004

(65) Prior Publication Data

US 2006/0034171 A1 Feb. 16, 2006

(51) Int. Cl.
*G01R 31/08* (2006.01)

(52) U.S. Cl. .................. 370/238; 370/252; 370/395.43; 709/235; 709/239; 709/242; 379/221.01

(58) Field of Classification Search .................. 370/392, 370/395.1–395.43, 238, 248, 338, 255, 230, 370/235, 389, 231, 252, 352, 409; 379/220.01, 379/221.01, 220.03, 114.02; 709/223, 224, 709/235, 239, 242
See application file for complete search history.

(56) References Cited

U.S. PATENT DOCUMENTS

| | | | |
|---|---|---|---|
| 5,491,694 A | 2/1996 | Oliver et al. | |
| 6,470,022 B1 * | 10/2002 | Rochberger | 370/437 |
| 6,690,653 B1 * | 2/2004 | Anbiah et al. | 370/256 |
| 7,127,056 B2 * | 10/2006 | Hu et al. | 379/221.03 |
| 7,162,520 B1 * | 1/2007 | Mudigonda et al. | 709/223 |
| 2004/0114580 A1 * | 6/2004 | Santry et al. | 370/355 |

FOREIGN PATENT DOCUMENTS

EP 1294146 A2 3/2003

OTHER PUBLICATIONS

Awduche et al, RSVP-TE: Extension to RSVP for LSP Tunnels, Dec. 2001, pp. 1-57.*
Ahmed et al, The ATM Forum Technical Committee: Private Network-Network Interface Specification version 1.0 PNNI 1.0, Mar. 1996, pp. 1-385.*
Bilel Jamousi, Constraint-Based LSP Setup using LD, Sep. 1999, pp. 1-38.*
Callon et al, A Framework for Multiprotocol Label Switching, Nov. 1997, pp. 1-44.*
Aldinger et al,The ATM Forum Technical Committee Policy Routing Version 1.0 AF-CS-0195.000, 2003.*
Aldinger et al., Policy Routing Version 1.0, The ATM Forum Technical Committee, XP-002378875, Apr. 2003.
ATM Formun Technical Committee, ATM Inter-Network Interface Specification Version 1.1, Sep. 2002.
ATM Formun Technical Committee, Policy Routing Version 1.0, Apr. 2003.
ATM Forum Technical Committee, Private Network-Network Interface Specification Version 1.1, Apr. 2002.

* cited by examiner

*Primary Examiner*—Chi H Pham
*Assistant Examiner*—Vinncelas Louis
(74) *Attorney, Agent, or Firm*—Kramer & Amado P.C.

(57) ABSTRACT

There is provided a method of forwarding a traffic flow in a communications network having at least one network node for which network traffic is selectively prevented from transiting the network node. The method includes the step of selecting a specified category of network traffic that is to be prevented from transiting the network node. The method also includes the step of determining a path within the network for forwarding the traffic flow, whereby the network node is excluded for transit in establishing the path where the traffic flow is identified with the specified category of network traffic.

17 Claims, 3 Drawing Sheets

FORWARDING OF NETWORK TRAFFIC IN RESPECT OF DIFFERENTIATED RESTRICTED TRANSIT NETWORK NODES

FIELD OF THE INVENTION

The present invention relates generally to the field of communications networks and more particularly, to a method and apparatus for the policy based forwarding or routing of message traffic in respect of restricted transit network nodes. By way of example, the invention may be especially adapted to source routed networks, such as those operating according to Asynchronous Transfer Mode (ATM) or Multiple Protocol Label Switching (MPLS) protocols. According to the invention, policy based forwarding of network traffic is utilized in conjunction with restricted transit forwarding in order to provision traffic flows, connections or calls so that some predetermined traffic flows, connections or calls may be permitted to traverse a network node notwithstanding its restricted transit status. As such, the restricted transit status of the network node in question differentiates between some traffic flows, connections or calls and not others, with the result that the restricted transit status of the node may be enforced or ignored selectively.

BACKGROUND OF THE INVENTION

It has been known in the field of communications networks to configure network nodes as restricted transit nodes. Namely, it has been known to restrict the transit of network traffic through specified nodes of a network so as to inhibit such traffic, or connections related thereto, from traversing one or more network nodes. Typically, the provisioning of restricted transit status in respect of a network node may prohibit network traffic or connections from transiting through the node, but may permit traffic or connections to originate or terminate at such a node. In known restricted transit mechanisms, during such time that a network node has been designated as a restricted transit node, no traffic is ordinarily permitted to transit the node. On the other hand, while a network node is not designated as a restricted transit node, all traffic is ordinarily permitted to transit the node.

In contrast to restricted transit routing, policy routing is utilized in the art of communications networks in order to control the manner in which network traffic or its related network connections are routed across a routing domain of the network. One known routing and signaling specification for the support of policy routing is that provided by the specification of The ATM Forum Technical Committee entitled "Policy Routing", version 1.0, which is dated April 2003 and is identified as document number af-cs-0195.000 (the "Policy Routing Specification"), the contents of which are hereby incorporated by reference. The Policy Routing Specification is an addendum to existing signaling specifications of The ATM Forum Technical Committee, namely: "ATM User-Network Interface (UNI) Signaling Specification", version 4.1, which is dated April 2002 and is identified as document number af-sig-0061.002; "ATM Inter-Network Interface Specification", version 1.1, which is dated September 2002 and is identified as document number af-cs-0125.002; and "Private Network-Network Interface Specification, version 1.1, which is dated April 2002 and is identified as document number af-pnni-0055.002, all as known to those skilled in the art of communications networks.

In typical policy routing mechanisms, and as described in the Policy Routing Specification, Network Elements ("Ne") or Resource Partitions ("Rp") may be identified and advertised throughout the network topology for purposes of routing traffic through the network in question. For instance, a network element may be a link or the entirety of a trunk group, whereas a resource partition may be a bandwidth partition of such a trunk group. In forwarding a traffic stream, a policy based request for forwarding may be made, wherein the request may describe a forwarding constraint to either (i) prescribe the avoidance or requirement of one or more particular network elements or (ii) prescribe the requirement of one or more particular resource partitions. Such a policy based request may be communicated by way of the forwarding constraint, such as a policy constraint, being assigned to a connection and signaled during the establishment of same. A node which is initiating the establishment of the network path for a traffic stream will use the advertised network elements and resource partitions together with the signaled policy constraint to compute or otherwise establish a network path that satisfies the constraint in question.

Policy routing capabilities may be used in communications networks to provide varying services based on different network utilization strategies. For instance, policy routing may be deployed in the provisioning of Virtual Backbone Networks ("VBN"), in the selection or avoidance of network paths associated with a predetermined link quality, in the routing of connections utilizing multiple ordered policy constraints, in the specification and use of bare network resources for inter-network core networks, in bandwidth partitioning between SVC and SPVC connections, and in the dynamic allocation of network bandwidth among identifiable categories of connections. However, it has not been known to utilize policy routing in conjunction with restricted transit capability so that the latter can be enabled or disabled in predetermined instances based on a specified policy.

SUMMARY OF THE INVENTION

According to a broad aspect of the present invention, there is provided a method of forwarding a traffic flow in a communications network having at least one network node thereof for which network traffic is selectively prevented from transiting same, the method comprising the steps of: (a) selecting a specified category of network traffic that is to be prevented from transiting the said network node; and (b) determining a path within the said network for forwarding the traffic flow, wherein the said network node is excluded for transit in establishing the said path where the traffic flow is identified with the specified category of network traffic.

BRIEF DESCRIPTION OF THE DRAWINGS

By way of illustration and not of limitation, embodiments of the present invention are next described with reference to the following drawings, in which.

DETAILED DESCRIPTION OF EMBODIMENTS

Figure 1:
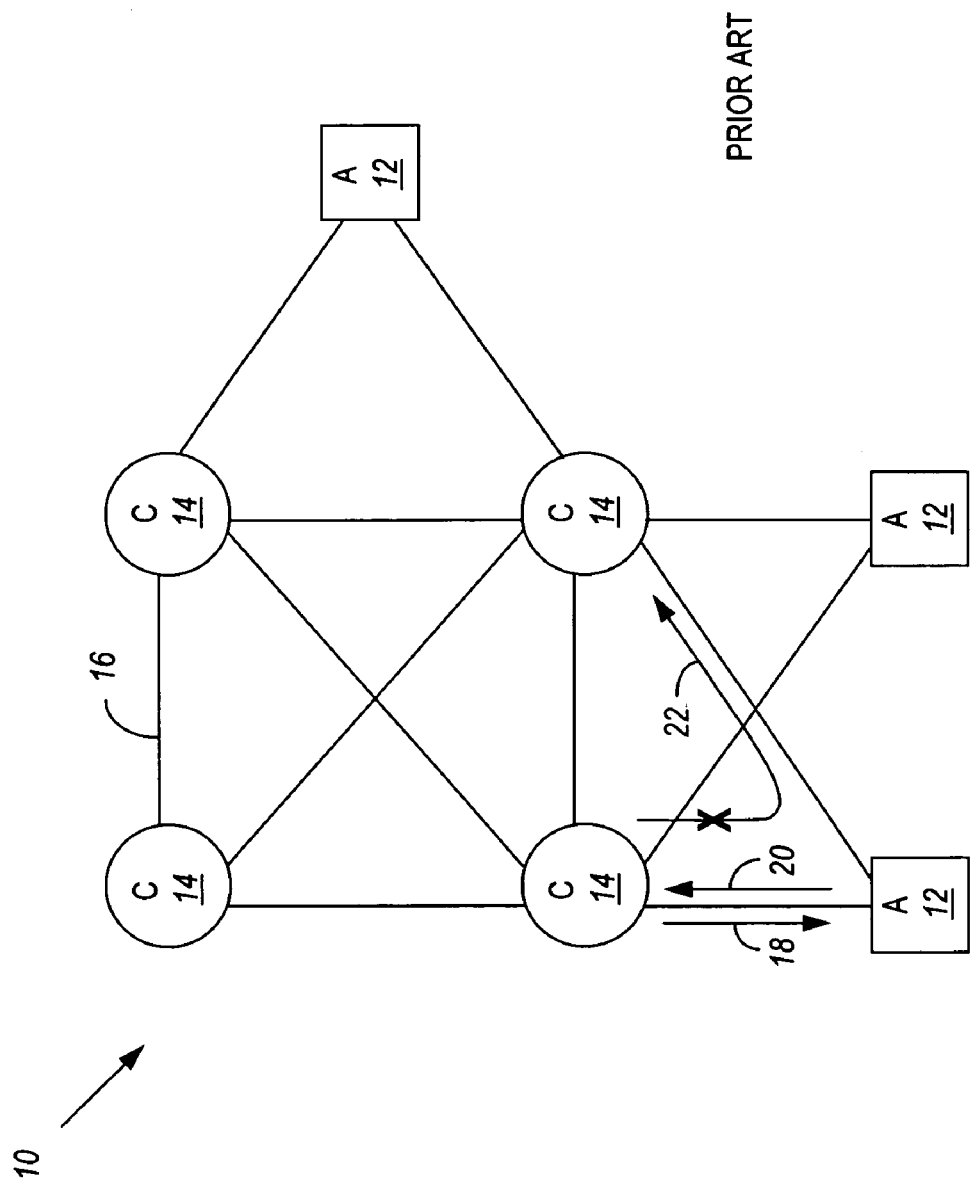
FIG. 1 illustrates an exemplary source routed network showing the prior art technique of restricted transit routing.

With reference to FIG. 1, there is shown the known mechanism for restricted transit routing in the context of an exemplary source routed network 10 operating according to the PNNI protocol. The network nodes 12 of the network 10, each denoted as nodes A, are access nodes. The network nodes 14 thereof are core nodes, and these are denoted as nodes C. The various network nodes 12 and 14 of the network 10 are interconnected by links 16 as are known to those skilled in this art. Under restricted transit routing techniques as known, it is possible to provision the network 10 so that the access network nodes 12 do not transit any network traffic. Such traffic can be routed over connections 18 or 20, which respectively either terminate at a network node 12 or originate with same. Other network traffic which does not terminate at or originate with an access network node 12, for instance a connection as at 22 from one core network node 14 to another core network node 14, is disallowed for routing through an access network node 12 if such node is provisioned or enabled for restricted traffic routing. The connection as at 22 has been depicted with an "X" so as to denote that it is disallowed in the particular example mentioned above.

Figure 2:
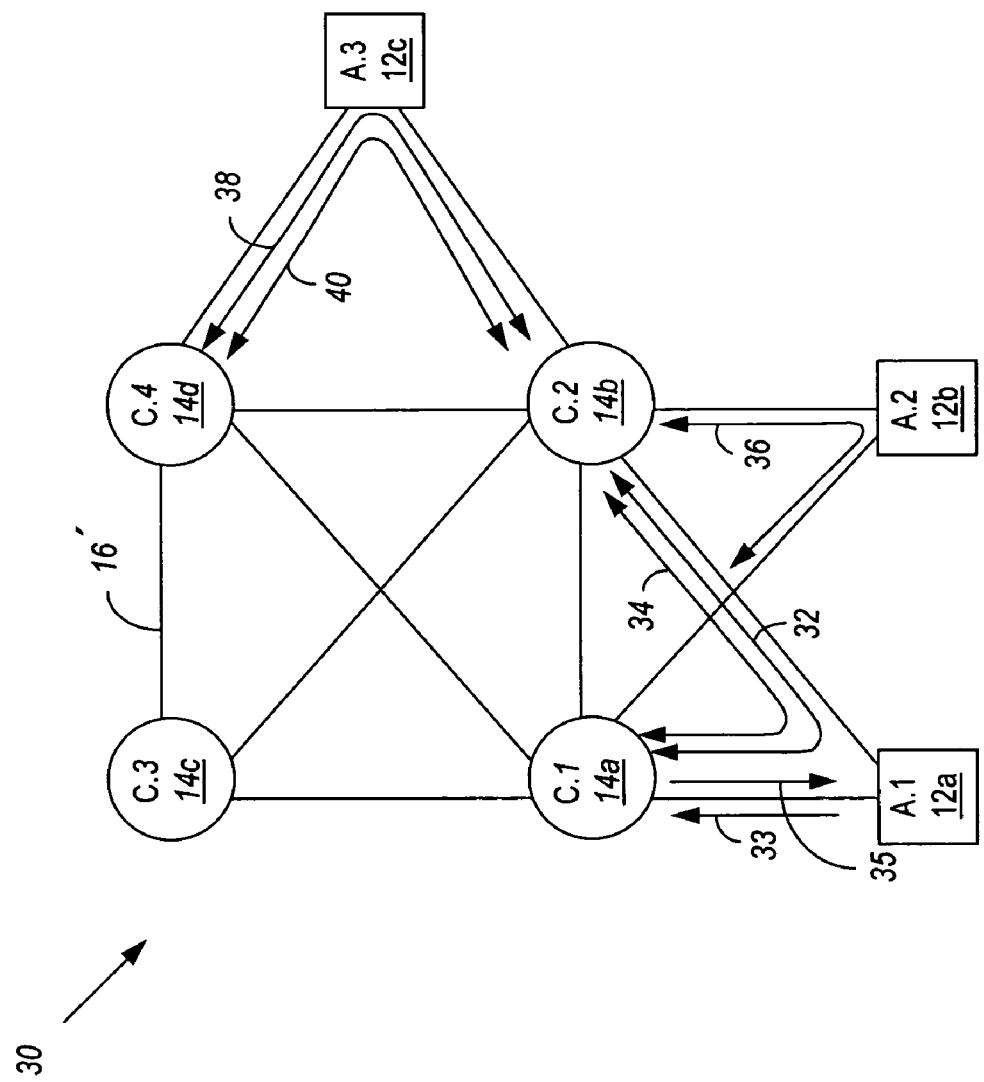
FIG. 2 depicts an exemplary source routed network in which an embodiment of the present invention may be deployed to provision differentiated restricted transit forwarding.

Turning to FIG. 2, a method according to one embodiment of the present invention is described with reference to a network 30 which illustrates an example of selectively permitting certain categories of traffic flows, connections or calls to traverse restricted transit nodes, as well as selectively permitting traffic flows, connections or calls which belong to certain Virtual Backbone Networks ("VBN"). Those skilled in the art should be made to appreciate that the present invention may be adapted to apply to any identifiable category or collection of traffic flows, connection or calls. The network 30 may for instance be a source routed network which operates according to the PNNI protocol. The network 30 has three edge or access network nodes 12a, 12b and 12c, 20 which are respectively denoted A.1, A.2 and A.3. Moreover, core network nodes 14a, 14b, 14c and 14d, additionally respectively denoted C.1, C.2, C.3 and C.4, are interconnected via links 16' to each other and to one or more of the access network nodes A.1, A.2 and A.3 in the manner known in this art. The network nodes A.1, A.2 and A.3 are all restricted transit nodes, in the sense previously defined, for sake of illustration.

In the network 30, mixed SPVC and SVC connections may be routed therein and if desired, the method and apparatus of the present invention may be deployed to permit one category of such connections to traverse an otherwise restricted transit node while not permitting the other category of such connections to do so. For example, since SVC connections may typically be shorter in duration and more dynamic than are SPVC connections, the turnover of SVC connection bandwidth is much higher than that for SPVC connections. Accordingly, it is not an uncommon network provisioning scheme to ensure there is enough bandwidth available for the longer duration SPVC connections that must originate and terminate a particular node, while setting some bandwidth aside for generally shorter duration SVC calls. As a result of the differences in bandwidth allocation and expected duration of SPVC versus SVC connections, it may be desirable to allow SVC connections to traverse the access nodes A.1, A.2 and A.3 if needed, and not to allow SPVC connections to traverse those same nodes since that bandwidth would be consumed for a long time and may not be originally planned for that node. With current restricted transit routing capability, all calls would either be permitted to transit or be restricted from transiting the access nodes A.1, A.2 and A.3. Thus, pursuant to prior art techniques it would not be known to allow only SVC connections to traverse a restricted transit node but yet restrict SPVC connections from doing so. In the example of network 30, however, SVC connections as at 32 are permitted to traverse the access network node A.1, notwithstanding the restricted transit status of same, while only originating and terminating SPVC connections as at 33 and 35 are allowed respectively from and to access network node A.1.

Likewise, in the case of Virtual Backbone Networks, it may be desirable for traffic engineering purposes or for reasons of call security or control for connections of one VBN to be permitted to traverse a restricted transit node while not permitting connections from another VBN from doing so. Thus, it may be deemed desirable if connections over a first VBN, namely VBN A, were allowed to transit only the access network nodes A.1 and A.3, notwithstanding the restricted transit status of those network nodes. This is shown by VBN A connections, as at 34 and as at 38, traversing the respective network nodes A.1 and A.3. In the case of connections over a second VBN, namely VBN B, it may be deemed desirable if connections over that VBN were allowed to transit only the access network nodes A.2 and A.3, as an exception to the otherwise restricted transit status of those network nodes. This is shown by VBN B connections, as at 36 and as at 40, traversing the respective network nodes A.2 and A.3. In general, allowing some predetermined traffic flows, connections or calls to traverse a restricted transit node while restricting all others from doing so can be expected to assist with the capacity planning of network resources. However, the problem with existing restricted transit routing is that it is applicable only on a nodal basis and does not allow the restricted transit status of a node to be applied to some traffic flows and not to others.

In one embodiment of the method of the present invention, an exemplary implementation of the invention is described again with reference to FIG. 2. Although this implementation is made specific to the PNNI protocol, those skilled in this art will understand that the invention is capable of implementation in other current or future networking protocols, for instance IP, MPLS, OSPF, GMPLS or IS-IS protocols, to name but a few examples. In the PNNI protocol a new type-length-value ("TLV") field may be created in the nodal Information Group ("IG") that is utilized in known PNNI advertisement messages. In known restricted transit routing, the restricted transit status of a network node is advertised using a single bit in the nodal IG. This bit in the prior art indicates whether the restricted transit status of a network node to which an IG pertains is either enabled or disabled. According to one embodiment of the invention, the new TLV field identifies traffic flows, connections or calls that either may be defined to recognize and comply with the enabled or disabled restricted transit status of the particular network node which advertises the TLV, or instead, may be defined to recognize and override the enabled or disabled restricted transit status of the node. The definitions in question may be made by way of known policy routing tags, if desired, and this is described in greater detail below. The advertisement of the TLV field as modified according to the above-mentioned embodiment will permit other network nodes to generate paths for the policy based traffic flows, connections or calls identified in the TLV field that take into account the differentiated restricted transit status of the advertising node.

The different categories of traffic flows, connections or calls identified by way of known policy routing tags in the new TLV field mentioned above can be made to correspond to policy constraints that will be requested by such traffic flows, connections or calls. For example, a VBN A call can be made to request a policy constraint that will take it along a path different from a VBN B call. Similarly, an SVC call can be made to request a policy constraint that will lead it through nodes or partitions different than those for an SPVC call.

Still with regard to FIG. 2, if it is desirable for the network node A.1 to restrict the transiting of all connections other than SVC calls or VBN A calls, the node A.1 may advertise a nodal IG to its peer nodes of the network 30 which contains a TLV field indicating that the restricted transit status of the node A.1 will apply at that node to all policy routing tags other than those of the policy constraints associated with SVC calls or VBN A calls. For instance, the policy routing tag P1 could relate to SPVC calls and the policy routing tag P2 could relate to SVC calls. For VBN identification, the policy routing tag P3 could relate to VBN A calls such as at 34 and 38 and the policy routing tag P4 could relate to VBN B calls such as at 36 and 40. In the given example, the nodal IG of network node A.1 may therefore indicate by means of its TLV field as aforesaid that the enabled restricted transit status of the node applies to all connections other than those with associated policy constraints containing policy routing tags P2 and P3. This advertisement of differentiated restricted transit status may be made if desired by indicating the policy routing tags P2 and P3 as exceptions to the enabled restricted transit status of the node or alternatively, by indicating the policy routing tags P1 and P4 as defining the prohibited connections of the restricted transit status in question. Based on the example given previously, the result in either case is that only traffic flows 32 and 34 would be permitted to transit the node A.1, with such traffic flows respectively pertaining to SVC calls and VBN A calls.

Similarly at network node A.2, its nodal IG may advertise that only policy based calls with policy constraints containing policy routing tag P4 are to traverse the node. Again, the TLV field of the nodal IG of network node A.2 may identify the policy routing tag P4 as an exception to the restricted transit status of the node when the node is advertising that its restricted transit status is enabled or alternatively, the policy routing tags P1, P2 and P3 may instead be listed to define the prohibited connections for restricted transit purposes. In either case, the end result is that only VBN B calls would be permitted to transit the node A.2 as at 36. Lastly, it may be desired for network node A.3 to transit only VBN A and VBN B calls, but no other calls within the network 30. In this instance, the nodal IG of network node A.3 may identify both policy routing tags P3 and P4 as defining connections that will be permitted to transit the node A.3 and therefore as being exceptions to the restricted transit status of that node when same is enabled. Instead, both policy routing tags P1 and P2 may be utilized to define prohibited connections for the node A.3 when the restricted transit status of same is enabled by advertising only policy routing tags P1 and P2 as being restricted transit and all other policy routing tags as not being restricted transit. Again, the end result is that both VBN A and VBN B calls would be permitted to transit the node A.3, respectively as at 38 and 40.

Those skilled in this art will understand that any of the nodes A.1, A.2 or A.3 may modify their nodal IG information at any desired time so as to advertise a different policy based routing criteria for the restricted transit status of the nodes. For instance, if the network node A.1 no longer possessed the capacity to allow SVC calls, it could thenceforth advertise a nodal IG with a TLV field that no longer indicates the policy routing tag P2 as an exception to the enabled restricted transit routing status or with a TLV field that newly indicates the policy routing tag P2 as a prohibited policy for purposes of the enabled restricted transit routing status in respect of node A.1.

Figure 5:
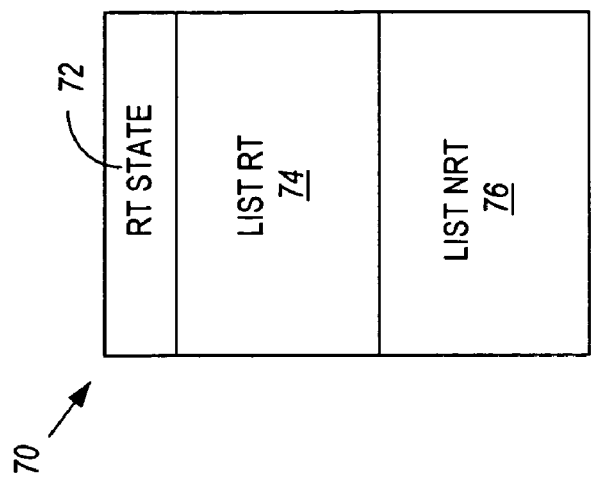
FIGS. 3 to 6 show alternative formats for a message that may be used according to other embodiments of the present invention in order to advertise the differentiated restricted transit forwarding capability of a network node.
Figure 4:
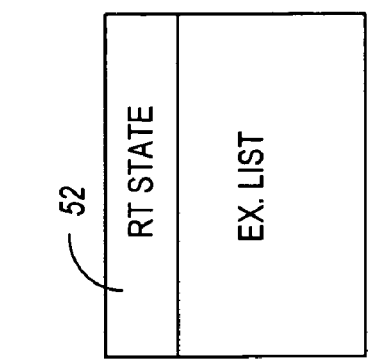
Figure 3:
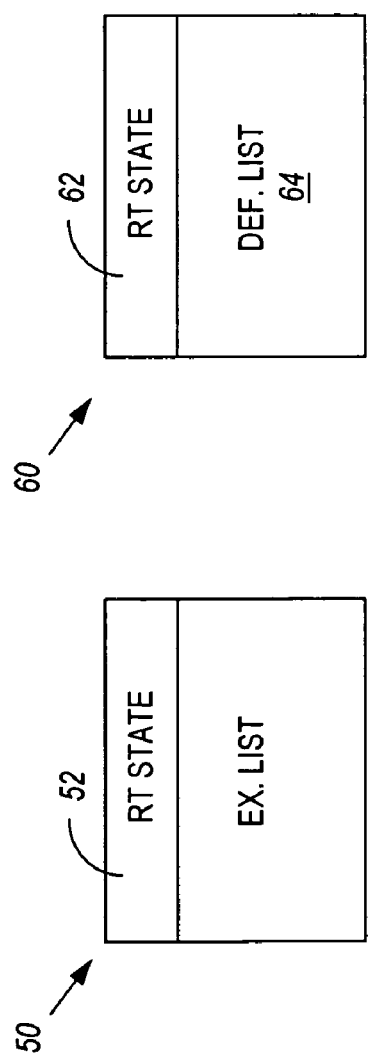

FIGS. 3, 4 and 5 illustrate alternative formats for the nodal IG message of a network node which advertises differentiated restricted transit capability to its peer network nodes according to the present invention. In FIG. 3, nodal IG message 50 contains a restricted transit flag 52 which denotes whether the restricted transit status of the node is enabled or disabled. A TLV field in the form of restricted transit exception list 54, denoted "EX. LIST", also forms part of the nodal IG message 50. The restricted transit exception list 54 may list policy routing tags associated with traffic flows, connections or calls which are to be permitted to transit the advertising node when the restricted transit flag indicates that restricted transit status is enabled. In such a case, any policy based path setup request that identifies any one of the traffic flows, connections or calls of the exception list 54 by means of associated policy routing tags will be admitted on the advertising node. This is described in further detail in what follows.

According to an embodiment of the present invention as illustrated in FIG. 3, the exception list 54 as previously described may be in the form of a Network Element ("Ne") identifier list coupled with a Resource Partition ("Rp") identifier list. For example, the Ne identifier list may contain the Network Service Category ("NSC") tags $Ne_1, Ne_2, \ldots Ne_n$, whereas the Rp identifier list may contain the NSC tags $Rp_1, Rp_2, \ldots Rp_n$. This may be summarized as follows:

$$\text{Ne-NSC list } (Ne_1, Ne_2, \ldots Ne_n) \quad (1)$$

$$\text{Rp-NSC list } (Rp_1, Rp_2, \ldots Rp_n) \quad (2)$$

The foregoing NSC tags are as defined in the Policy Routing Specification, referenced above. Where the restricted transit flag 52 as aforesaid indicates that the restricted transit status is enabled, the exception list 54 originally reflected in the form of the foregoing coupled lists (1) and (2) can be further combined to form a single logically and'd exception element as follows:

$$\{Ne_1 \text{ and } Ne_2 \text{ and } \ldots Ne_n \text{ and } Rp_1 \text{ and } Rp_2 \text{ and } \ldots Rp_n\} \quad (3)$$

As known to those skilled in this art, a call or connection policy that is signaled according to the Policy Routing Specification may have multiple policy elements associated therewith. These policy elements are groupings of policy routing tags. As explained in greater detail below, where a policy based call requires by way of any one of its signaled policy elements any combination or subset of the NSC tags found in exception element (3) above, then the call or connection in question will be allowed to transit the network node that is advertising the Ne identifier list (1) and the Rp identifier list (2). Where no such policy elements of the signaled policy requires any combination or subset of the NSC elements or tags of exception element (3), then the call or connection in question cannot be routed through the said network node. If the signaled policy in question complies with the Policy Routing Specification, the policy elements of the signaled policy are first derived by a process of logical expansion prior to making the aforesaid determination as to whether the call or connection in question will be allowed to transit the network node that is advertising its differentiated restricted transit status according to the present invention. This process of logical expansion is explained in further detail below.

The exception list 54 may instead or additionally list policy routing tags associated with traffic flows, connections or calls which are to be prohibited when the restricted transit flag indicates that restricted transit status is disabled. In such a case, any policy based path setup request whose policy elements each identifies any one of the traffic flows, connections or calls of the exception list 54 by means of its associated policy routing tags will not be admitted on the advertised node. This is addressed in further detail in what follows.

Where the restricted transit flag as aforesaid indicates that the restricted transit status is disabled, the exception list 54 in the form of the foregoing lists (1) and (2) can be combined to form a sequence of logically or'd and individualized exception elements, as follows:

$$\{Ne_1\} \text{ or } \{Ne_2\} \text{ or } \ldots \{Ne_n\} \text{ or } \{Rp_1\} \text{ or } \{Rp_2\} \text{ or } \ldots \{Rp_n\} \quad (4)$$

As explained in greater detail below, where any one or more NSC tags of the individualized exception elements (4) above is contained by or consists of each and every one of the signaled policy elements of a policy based call, then the call or connection in question will not be allowed to transit the network node that is advertising the Ne identifier list (1) and the Rp identifier list (2). The use of the expression "contained by" is meant to convey that the signaled policy element comprises at least the individualized exception element (4) in question. Alternatively stated, if at least one policy element of the said policy based call does not contain or consist of at least one of the said NSC tags of the individualized exception elements (4), then the said network node will allow the said call or connection to transit the node. As previously mentioned, if the signaled policy in question complies with the Policy Routing Specification, the signaled policy elements of the signaled policy are first derived by a process of logical expansion as described more fully below.

The foregoing descriptions in relation to the embodiment of FIG. 3 concerning the use of the exception list 54 to identify calls or connections that are to be allowed or prohibited from transiting a network node in the context of a restricted transit status therefor that is either enabled or disabled, will next be further described in relation to call or connection policies that follow the aforementioned Policy Routing Specification. The general format of a signaled policy, as known to those skilled in this art, may be represented as follows:

$$\text{Policy:: } = \{[\text{require}(\text{logical\_or}|\text{logical\_and}\{Ne\text{-NSC\_list}\}; \quad (5)$$

$$\text{logical\_or}|\text{logical\_and}\{Rp\text{-NSC\_list}\});$$

$$\text{must-avoid}(\text{logical\_or}|\text{logical\_and}\{Ne\text{-NSC\_list}\})]\}$$

where: {Ne-NSC list} is a list of NSC policy routing tags pertaining to network elements;

{Rp-NSC list} is a list of NSC policy routing tags pertaining to resource partitions;

"require" denotes a component of the policy which is a requirement for routing a call or connection associated with the signaled policy (5);

"must-avoid" denotes a component of the policy which is required to be avoided for routing the call or connection associated with the signaled policy (5); and "logical_or" and "logical_and" are alternative operands that respectively denote whether the immediately ensuing constituent policy routing tags of the lists {Ne-NSC list} or {Rp-NSC list} are to be either logically or'd or logically and'd, as the case may be. It is also possible for either or both of the lists {Ne-NSC list} and {Rp-NSC list} to contain a single policy routing tag, in which case the operands "logical_or" and "logical_and" will not be used on such individual items. Moreover, in the Policy Routing Specification, each of the "require" items of the signaled policy (5) are to be interpreted as being logically and'd in relation to one another. These "require" items are the constituent parts of the "require" component of the signaled policy (5) as next explained.

The "require" component of the signaled policy (5), namely the component consisting of:

logical_or | logical_and {Ne-NSC list};

logical_or | logical_and {Rp-NSC list} (6)

can further be divided into smaller elements in the nature of required policy elements. To provide a simple example of the aforementioned expansion of the require component (6), a policy defined as:

[require (logical_or $\{Ne_1, Ne_2\}$)] (7)

can be expanded into the required policy elements ($Ne_1$) and ($Ne_2$), each of which are logically or'd in relation to the other. Likewise, a policy defined as:

[require (logical_and $\{Ne_1, Ne_2\}$)] (8)

can be expanded into the single required policy element ($Ne_1$ & $Ne_2$).

Where more than one list of NSC policy routing tags is found in a require component (6), the require component (6) can be expanded by the logical multiplication of the lists {Ne-NSC list} and {Rp-NSC list}, with each resulting required policy element being logically or'd in relation to one another. By way of example, a policy defined as:

[require (logical_or$(Ne_1, Ne_2)$; logical_and$\{Rp_1, Rp_2\}$)] (9)

can be expanded into two required policy elements, namely ($Ne_1$ & $Rp_1$ & $Rp_2$) and ($Ne_2$ & $Rp_1$ & $Rp_2$), with these two required policy elements being logically or'd in relation to one another. By way of further example, a policy defined as:

[require (logical_or$(Ne_1, Ne_2)$; logical_or$\{Rp_1, Rp_2\}$)] (10)

can be expanded into four required policy elements, namely (Ne& $Rp_1$), ($Ne_1$ & $Rp_2$), ($Ne_2$ & $Rp_1$) and ($Ne_2$ & $Rp_2$), with these four required policy elements being logically or'd in relation to one another.

A similar analysis as outlined above may be utilized to expand the "avoid" component of the signaled policy (5), namely the component consisting of:

[must-avoid (logical_or | logical_and {Ne-NSC_list}] (11)

However, in the embodiment of the present invention illustrated in FIG. 3, the avoid component (11) of the signaled policy (5) is not utilized in order to compare the signaled policy (5) with the advertised differentiated restricted transit capability of the node in question so as to determine whether or not to route a call or connection for transiting the said node.

Once the signaled policy (5) has been expanded as aforesaid into its constituent required policy elements, those required policy elements are utilized to compare the signaled policy (5) with the advertised differentiated restricted transit capability of the node in question, in the manner earlier explained.

Turning now to another embodiment of the invention as illustrated in FIG. 4, nodal IG message 60 contains a flag 62 which denotes whether the restricted transit status of the node is enabled or disabled. A TLV field in the form of a restricted transit definition list 64, denoted "DEF. LIST", also forms part of the nodal IG message 60. The restricted transit definition list 64 may list policy routing tags associated with traffic flows, connections or calls which are to be prohibited to transit the advertising node when the restricted transit flag indicates that restricted transit status is enabled. In such a case, any policy based path setup request that identifies any one of the traffic flows, connections or calls of the definition list 64 by means of associated policy routing tags will not be admitted on the advertised node. The definition list 64 may instead or additionally list policy tags associated with traffic flows, connections or calls which are to be permitted when the restricted transit flag indicates that restricted transit status is disabled. In such a case, any policy based path setup request that identifies any one of the traffic flows, connections or calls of the definition list 64 by means of its associated policy routing tags will be admitted on the advertised node. Those skilled in this art will appreciate that analogous data structures to those earlier described in relation to the embodiment of FIG. 3 may be utilized to create the restricted transit definition list 64, for instance by means of a Network Element ("Ne") identifier list coupled with a Resource Partition ("Rp") identifier list as previously mentioned. As well, analogous rules and techniques to those previously described may be employed in order to compare a signaled policy with the said restricted transit definition list 64 for purposes of determining whether or not a call or connection is to be transited through a node which is advertising a differentiated restricted transit capability.

Turning to yet another embodiment as illustrated in FIG. 5, nodal IG message 70 again contains a flag 72 which denotes whether the restricted transit status of the node is enabled or disabled. In this instance, one or more TLV fields in the form of two restricted transit lists 74 and 76 also form part of the nodal IG message 70. The restricted transit list 74, denoted "LIST RT", is utilized in the event the flag 72 denotes that the restricted transit status of the advertising node is enabled. The restricted transit list 76, denoted "LIST NRT", is utilized in the event the flag 72 denotes that the restricted transit status of the advertising node is disabled. As with the respective examples of nodal IG messages 50 and 60, the restricted transit lists 74 and 76 may either denote exceptions for each of the restricted transit statuses of the advertising node in question or denote definitions for each of same, with the analogous consequences ensuing in the event a policy based path setup message identifies any of the listed traffic flows, connections or calls. Those skilled in this art will understand that analogous data structures, rules and techniques may be employed, as compared to those previously defined in relation to the embodiment of FIG. 3, in order to implement the two restricted transit lists 74 and 76 and in order to compare a signaled policy therewith.

Figure 6:
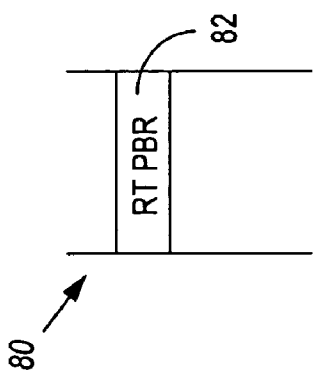

With reference now to a still further embodiment as illustrated in FIG. 6, yet another nodal IG message 80 is presented, wherein a flag 82, also identified as "RT PBR", denotes the restricted transit status of a network node that is differentiated as to traffic flows, connections or calls that are policy based as opposed to non-policy based. In this example, if the flag 82 is enabled, all policy based traffic flows, connections or calls will be prohibited from transiting the advertising node. On the other hand, where the flag 82 is disabled, all traffic flows, connections or calls will be admitted to transit the said node, regardless of whether or not they are policy based in nature.

Those skilled in this art will appreciate that other data structures may be conceived for advertising the differentiated restricted transit status of a network node according to the present invention. As well, other rules and techniques than those described herein by way of example may be employed to compare a signaled policy with such advertised data structures for purposes of determining whether a call or connection is to be admitted or prohibited to transit a network node. Those skilled in the art will understand that various other modifications of detail may be made to the present invention, all coming within its spirit and scope.

We claim:

1. A method of using policy routing in conjunction with restricted transit to forward network traffic in a communications network having a plurality of peer network nodes, the method comprising:

receiving, in a network node, a nodal Information Group (IG) message generated by an advertising node to advertise a differentiated restricted transit status of the advertising node to the plurality of peer network nodes, wherein the nodal IG message comprises:

a flag that indicates whether a restricted transit status is enabled or disabled for the advertising node, and an exception list that lists policy tags associated with predetermined categories of the network traffic that are permitted to transit the advertising node when the restricted transit status is enabled for the advertising node, wherein the exception list and the flag define the differentiated restricted transit status of the advertising node;

receiving a policy-based path setup request for the network traffic;

determining whether the policy-based path setup request involves at least one of the predetermined categories of the network traffic;

generating paths for the network traffic that take into account the at least one of the predetermined categories of the network traffic and the differentiated restricted transit status of the advertising node; and wherein the differentiated restricted transit status permits SVC connections to traverse the advertising node but prohibits SPVC connections.

2. A method of using policy routing in conjunction with restricted transit to forward network traffic in a communications network having a plurality of peer network nodes, the method comprising:

receiving, in a network node, a nodal Information Group (IG) message generated by an advertising node to advertise a differentiated restricted transit status of the advertising node to the plurality of peel" network nodes, wherein the nodal IG message comprises:

a flag that indicates whether a restricted transit status is enabled or disabled for the advertising node, and a definition list that lists policy tags associated with predetermined categories of the network traffic that are not permitted to transit the advertising node when the restricted transit status is enabled for the advertising node, wherein the definition list and the flag define the differentiated restricted transit status of the advertising node;

receiving a policy-based path setup request for the network traffic;

determining whether the policy-based path setup request involves at least one of the predetermined categories of the network traffic;

generating paths for the network traffic that take into account the at least one of the predetermined categories of the network traffic and the differentiated restricted transit status of the advertising node; and wherein the differentiated restricted transit status permits SVC connections to traverse the advertising node but prohibits SPVC connections.

3. A method of using policy routing in conjunction with restricted transit to forward network traffic in a communications network having a plurality of peer network nodes, the method comprising:
- receiving, in a network node, a nodal Information Group (IG) message generated by an advertising node to advertise a differentiated restricted transit status of the advertising node to the plurality of peer network nodes, wherein the nodal IG message comprises:
- a flag that indicates whether a restricted transit status is enabled or disabled for the advertising node,
- a first restricted transit list that lists policy tags associated with predetermined categories of the network traffic that are permitted to transit the advertising node when the restricted transit status is enabled for the advertising node,
- a second restricted transit list that lists policy tags associated with predetermined categories of the network traffic that are permitted to transit the advertising node when the restricted transit status is disabled for the advertising node, wherein the first restricted transit list, the second restricted transit list, and the flag define the differentiated restricted transit status of the advertising node;
- receiving a policy-based path setup request for the network traffic;
- determining whether the policy-based path setup request involves at least one of the predetermined categories of the network traffic;
- generating paths for the network traffic that take into account the at least one of the predetermined categories of the network traffic and the differentiated restricted transit status of the advertising node; and
- wherein the differentiated restricted transit status permits SVC connections to traverse the advertising node but prohibits SPVC connections.

4. The method of claim 1, wherein the exception list comprises a Network Element identifier list and a Resource Partition list.

5. The method of claim 2, wherein the definition list comprises a Network Element identifier list and a Resource Partition list.

6. The method of claim 3, wherein at least one of the first restricted transit list and the second restricted transit list comprises a Network Element identifier list and a Resource Partition list.

7. The method of claim 1, wherein the communications network is a Virtual Backbone Network operating according to the PNNI protocol.

8. The method of claim 2, wherein the communications network is a Virtual Backbone Network operating according to the PNNI protocol.

9. The method of claim 3, wherein the communications network is a Virtual Backbone Network operating according to the PNNI protocol.

10. The method of claim 1, further comprising:
- modifying the nodal JIG message at any desired time to advertise a different policy-based routing criterion.

11. The method of claim 2, further comprising:
- modifying the nodal IG message at any desired time to advertise a different policy-based routing criterion.

12. The method of claim 3, further comprising:
- modifying the nodal IG message at any desired time to advertise a different policy-based routing criterion.

13. The method of claim 1, further comprising:
- using the exception list to recognize and override the restricted transit status of the advertising node.

14. The method of claim 2, further comprising:
- using the definition list to recognize and comply with the restricted transit status of the advertising node.

15. The method of claim 1, wherein the predetermined categories of the network traffic are not permitted to transit the advertising node when the restricted transit status is disabled for the advertising node.

16. The method of claim 2, wherein the predetermined categories of the network traffic are not permitted to transit the advertising node when the restricted transit status is disabled for the advertising node.

17. The method of claim 3, wherein the predetermined categories of the network traffic are not permitted to transit the advertising node when the restricted transit status is disabled for the advertising node.

* * * * *